UNITED STATES PATENT OFFICE.

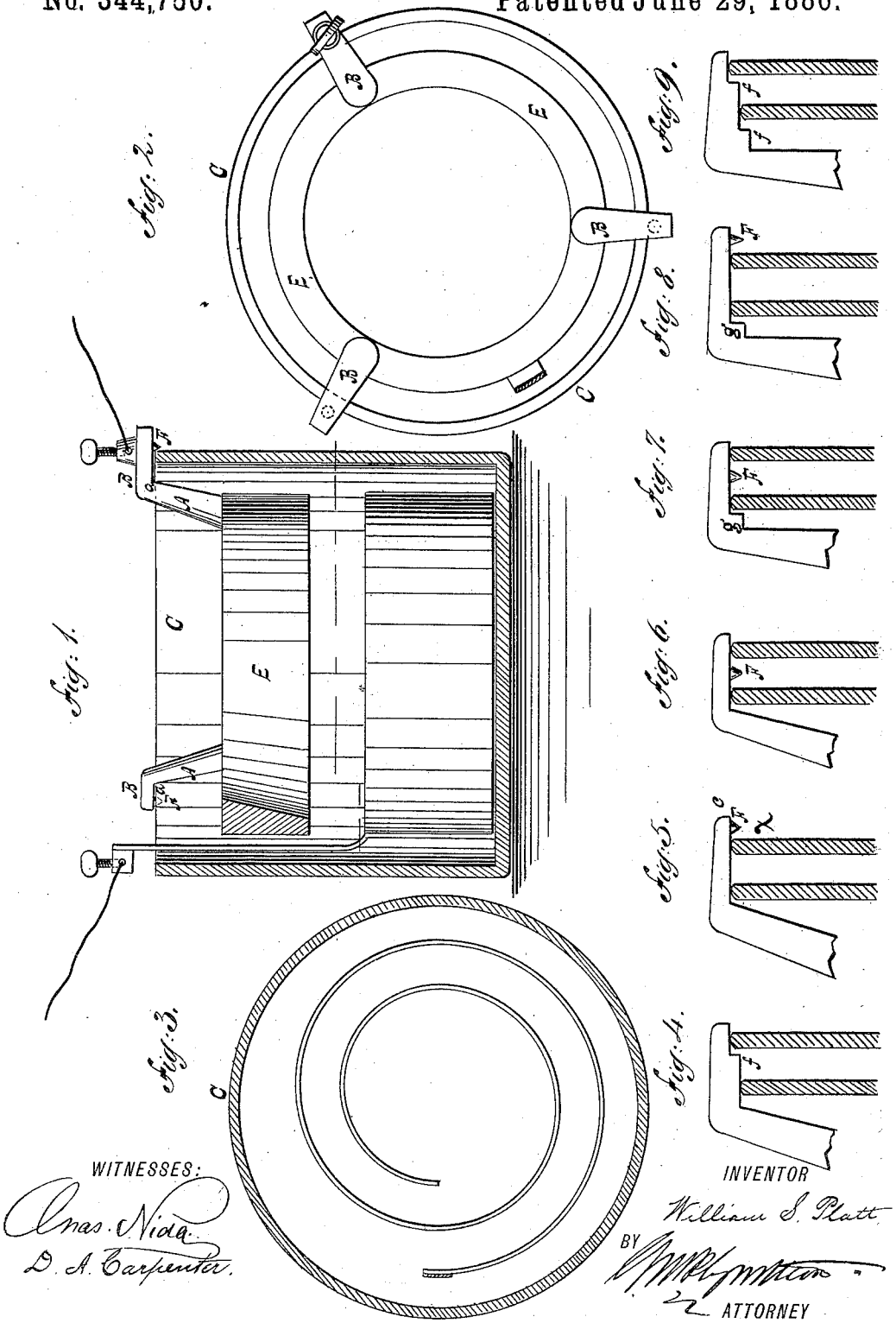

WILLIAM S. PLATT, OF WATERBURY, CONNECTICUT; IRVING G. PLATT (ADMINISTRATOR OF SAID WILLIAM S. PLATT, DECEASED) ASSIGNOR TO THE PLATT BROTHERS & COMPANY, OF SAME PLACE.

ZINC FOR ELECTRIC BATTERIES.

SPECIFICATION forming part of Letters Patent No. 344,750, dated June 29, 1886.

Application filed November 27, 1885. Serial No. 184,044. (No model.)

*To all whom it may concern:*

Be it known that I, WILLIAM S. PLATT, of Waterbury, county of New Haven, State of Connecticut, have invented a new and useful Improvement in Zincs for Electric Batteries; and I declare the following to be a full, clear, and exact description of the same, reference being had to the accompanying drawings, forming part of this specification.

This invention relates to an improvement in zincs for galvanic batteries; and the invention consists in a zinc for a galvanic battery constructed in the manner and for the purpose hereinafter particularly shown and described.

In the accompanying sheet of drawings, Figure 1 is a vertical section of cell, showing position of zinc; Fig. 2, a plan or top view of zinc; Fig. 3, a cross-section of cell, showing position of copper element; Figs. 4 and 9, side views showing offsets on zinc; and Figs. 5, 6, 7, and 8 show modified positions of stops.

Similar letters of reference indicate like parts in the several figures.

This invention relates particularly to the zinc electrode of a galvanic battery, especially such electrodes as are employed in what is commonly known as the "gravity-battery," in which the zinc electrode is suspended in the glass jar above the copper element in the bottom of the jar, all of which is well known; and it is also well known that should this zinc electrode while so suspended have part of its circumference in contact or nearly in contact with the inner walls of the glass jar then the bubbles of hydrogen gas which form in the cell will bank up between the walls of the glass cell and that part of the zinc electrode which is nearest to the cell, and these hydrogen bubbles prevent the proper oxidation of the electrode at that place; hence the necessity for keeping the zinc electrode in batteries of the gravity construction so placed that the zinc electrode will be central within the cell, or, in other words, so that the circumference of the zinc will throughout be practically equally distant from the walls of the cell. To accomplish this I construct my zinc electrode with the ordinary bars, A, and arms B horizontally fixed to the same, in which there is nothing new or intended to be original with me, and so far a zinc of this construction, providing it were always used in a cell of such a diameter as would necessarily bring the edge of the cell snugly in the angle $a$, formed by the junction of the bars A and arms B, would answer every purpose; but since the diameters of the glass cells vary—that is to say, since cells of two different capacities are usually supplied by the dealers in such things, while the diameter of the zinc electrode designed for these two cells remains unchanged—it is apparent that while the centering, so to speak, of the zinc electrode in one cell would be easy and certain, its centering in the other or larger cell would be uncertain and susceptible of derangement, and therefore to adapt the zinc electrode to these cells of different diameters, so that its centering will be certain under all ordinary circumstances, is the chief purpose of this invention, and it is accomplished in this wise.

Referring to Fig. 1, it will be seen that the angle or joining at $a$ of the bars A and arms B forms at once a convenient resting-place for the edge of the jar C; and it will be equally obvious on referring to Fig. 5 that should the zinc electrode E be placed in a cell, X, as is shown in that figure, the edge of the cell would not find a resting-place at the junction $a$. To the contrary, it may rest at any place on the arms B between this junction at $a$ and the ends of the arms $c$, so that in inserting this zinc electrode, or even after it is inserted, there is nothing to prevent accidental displacement of the central position of the electrode within the cell, so that one part of the circumference of the electrode will be nearly or fully in contact with the walls of the cell, and at that place oxidation will practically cease by reason of the interposition of the hydrogen bubbles, as before stated. Now, to prevent the displacement of the electrode from a central position within the cell, or to insure it retaining that position, I provide the arms B with one or more stops, F. These stops are either cast or fixed to the under sides of the arms B, and they may consist of a projection located at the extremity of the arm B, as in Fig. 5, or elsewhere, as in Fig. 6, or the under side of the arm B may have formed thereon a series of offsets, f. It is common where the bars A are cast at right angles to the zinc electrode to form one offset, g; but the purpose of that is simply to keep the walls of the cell from coming in contact with the zinc when a cell of given size is used; but this is usually accomplished, however, by casting the bars A at an oblique angle with the electrode, as shown in Figs. 4, 5, 6. Now, when my zinc is placed centrally in, say, a cell of six inches in diameter, the edge of the cell will rest practically in the angle a, and the zinc necessarily be kept centrally within the cell, since the bars A will prevent its displacement; but in a cell of, say, seven inches in diameter, the edge of the cell would be some distance from the angle a, so that the zinc could slide about uncontrolled within the cell; but by reason of my stops F the extent to which the zinc can move within the cell must be governed by the position of the stops which control the position of the zinc, and therefore prevent its accidental displacement, and so with the offsets f, the edge or sides of the cell being in contact with one or the other of these offsets, they in like manner prevent the displacement of the zinc from its central position, so that my zinc, when constructed substantially as described, may be used with equal facility in jars of different diameters.

Having now described my invention, what I claim as new, and desire to secure by Letters Patent, is—

In a galvanic battery, the combination of a cell with a zinc electrode provided with bars A and arms B, having one or more projections, whereby said electrode is adapted to cells of different diameters, as and for the purpose described.

WILLIAM S. PLATT.

In presence of—
ANGELO BURRITT,
NATHANIEL R. BRONSON.